United States Patent [19]

Goodfellow

[11] 4,052,496
[45] Oct. 4, 1977

[54] METHOD OF MAKING A TIRE BY FIRST MOLDING A TREAD AND THEN MOLDING SEPARATE SIDEWALLS ONTO THE TREAD

[75] Inventor: Anthony Gérald Goodfellow, Maghull, near Liverpool, England

[73] Assignee: Dunlop Limited, England

[21] Appl. No.: 579,238

[22] Filed: May 20, 1975

[30] Foreign Application Priority Data

May 28, 1974 United Kingdom ............... 23576/74

[51] Int. Cl.² ........................ B29H 3/08; B29H 5/02
[52] U.S. Cl. ............................. 264/251; 264/254;
264/255; 264/259; 264/313; 264/326; 264/328;
264/347; 425/DIG. 44
[58] Field of Search ............... 264/250, 313, 315, 326,
264/329, 254, 251, 255, 259, 328, 337, 250, 347;
425/DIG. 44

[56] References Cited

U.S. PATENT DOCUMENTS

| 2,497,226 | 2/1950 | McNeill | 264/250 |
|---|---|---|---|
| 2,710,425 | 6/1955 | Rhodes | 264/209 |
| 3,843,292 | 10/1974 | Kitamoto et al. | 264/315 |

FOREIGN PATENT DOCUMENTS 2,132,430  11/1972  France

Primary Examiner—Willard E. Hoag
Attorney, Agent, or Firm—Stevens, Davis, Miller & Mosher

[57] ABSTRACT

A pneumatic tire is moulded using a mould core of cured rubber the radial sectional shape of which is the same as the internal radial sectional configuration of the finished tire. The opposite sides of the core are supported by fitting plates while a tread portion of tire is moulded onto the exposed outer periphery of the core. Thereafter the side plates are removed in turn and replaced by sidewall mould halves enabling sidewalls to be moulded against the core in contact with the tread portion.

7 Claims, 1 Drawing Figure

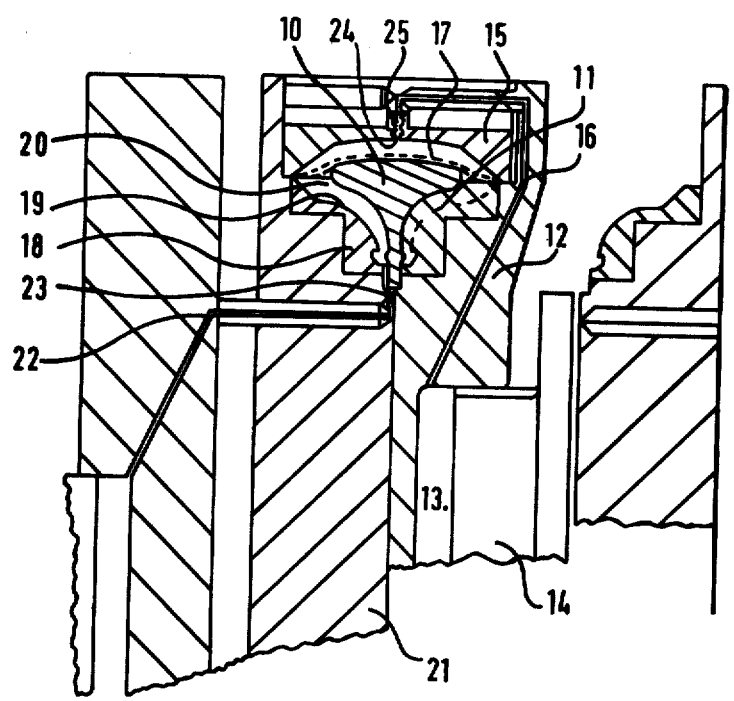

METHOD OF MAKING A TIRE BY FIRST MOLDING A TREAD AND THEN MOLDING SEPARATE SIDEWALLS ONTO THE TREAD

This invention relates to the manufacture of pneumatic tires.

According to the invention there is provided a method for the manufacture of a pneumatic tire comprising initially moulding the tread portion of the tire from uncured rubber in an annular mould cavity the radially inner surface of the cavity being the surface of a mould core of cured rubber, the mould core having substantially the shape of the interior of the tire to be moulded, and being supported during moulding of the tread by rigid side plates which engage the sidewall moulding surface of the core, removing said side plates after moulding said tread, replacing them by mould halves defining sidewall moulding cavities against the sidewall moulding surface of the core and forcing uncured rubber into the sidewall moulding cavities to mould said sidewalls onto the tread.

The moulding of the tread and of the sidewalls may be by injection or transfer moulding. Preferably the sidewalls are moulded not simultaneously but in succession to avoid movement of the core.

Preferably an inextensible reinforcing belt is inserted into the tread mould cavity prior to moulding the tread, the uncured tread rubber thus being moulded onto a pre-assembled reinforcement. The sidewalls preferably do not contain plies of reinforcing fabric, and consist entirely of rubber except, possibly, for an inextensible bead core.

The cured rubber core is preferably in a state of radially inward compression when the tread is moulded the reinforcement around the core thus being in a state of tension. The manner in which this is achieved is more fully described in co-pending U.S. Patent application Ser. No. 579,424, filed May 21, 1975.

The rubber of the sidewalls and tread is preferably cured prior to removal of the core, the latter being preferably coated with a suitable release agent to permit its removal. The removal of the core is facilitated by the fact that it is made of rubber which is flexible. It will be appreciated that whilst the rubber core is rigidly supported by the mould halves or side plates its very high modulus in compression enables it to act as a suitable core. When the support is removed the flexibility of the core enables it to be readily distorted to be removed from the moulded tire.

Preferably the uncured rubber used in moulding the tread portion of the tire has been mechanically worked by a feed screw, sufficiently to destroy its nerve or memory without starting it on its cure cycle, i.e. the rubber is warm but is below the threshold temperature at which its cure rate begins to rise rapidly.

The invention will now be described in more detail by way of example only with reference to the accompanying drawing which is a cross-sectional view of a moulding apparatus.

The drawing is in two halves (a) and (b) of which (a) illustrates the apparatus as used during moulding of the tread and (b) illustrates the apparatus as used during moulding of the sidewalls.

As shown in part (a) the apparatus consists of a rubber core 10, supported by a side plate 11 contoured to the shpae of the core 10. An example of the core or former 10 and its manner of use is described in co-pending U.S. Pat. application Ser. No. 579,424. The side plate 11 is carried on a press platen 12 in the centre of which is a cavity 13 which forms a transfer chamber into which worked uncured rubber may be loaded through an inlet (not shown). A plunger 14 co-operates with the cavity 13 to permit the rubber to be forced from the chamber by compressing the plunger 14 into the cavity 13.

The interior and exterior surfaces of the tread moulding cavity are defined by the core 10 and a tread moulding ring 15. The ring 15 is divided along its centre line, by an annular gate 24 surrounded by an annular reservoir 25 connected by runners 16 to the cavity 13 to permit the rubber to be transferred from the cavity 13 into the tread moulding cavity. Reference is made to co-pending U.S. Pat. application Ser. No. 58,587 filed May 28, 1975 for a clear understanding of the nature and function of the gate 24 and reservoir 25.

An inextensible reinforcing band 17 is located on the core before inserting the core into the tread moulding cavity.

After moulding the tread and partially curing the tread rubber the side plate 11, plate 12 and plunger 14 are replaced by a mould half 18 carrying a sidewall moulding surface 19 which is brought up to the core 10 to define a sidewall mould cavity 20. The mould half 18 is supported on a plate 21 containing runners 22, 23 from an injection system (not shown).

Sidewall rubber is then injected into the cavity 20, and joins with the tread rubber. The other sidewall is similarly moulded in a subsequent operation since it would be difficult to balance the flow into the two sidewall cavities if both were filled simultaneously.

The tire is then cured whilst maintaining the temperature of the runners below the threshold temperature. The plates 21 are taken away and the core 10 removed from the interior of the cured tire.

It will be appreciated that throughout this process it is necessary to control accurately the temperatures of all the parts of the apparatus. This is achieved by the provision of many channels for heating and cooling fluids which are not shown in the drawing.

The process of this invention may be utilized to manufacture tires of conventional shapes i.e. having convex sidewalls but it is also particularly suitable for the manufacture of tire having concave sidewalls which operate in compression as described, for example, in U.S. Pat. No. 3,805,868.

Having now described my invention, what I claim is:

1. A method for the manufacture of a pneumatic tire comprising initially moulding the tread portion of the tire from uncured rubber in an annular mould cavity the radially inner surface of the cavity being a surface of a solid mould core of cured rubber and the radially outer surface of the cavity being a surface of a tread ring mould, the mould core having substantially the shape of the interior of the tire to be moulded, and being supported during moulding of the tread portion by rigid side plates which engage sidewall moulding surfaces of the core, removing said side plates after moulding said tread portion, leaving said tread portion in place between said core and said tread ring mould, replacing said side plates by mould halves defining sidewall moulding cavities against the sidewall moulding surfaces of the core, forcing uncured rubber into the sidewall moulding cavities to mould said sidewalls onto the tread portion, and curing said rubber of said tread portion and said sidewalls.

2. A method as claimed in claim 1, wherein first only one of the side plates is replaced by a mould half and the other side plate is replaced by a mould half subsequent to the moulding of one of the sidewalls.

3. A method as claimed in claim 1, wherein a substantially inextensible annular reinforcing structure is positioned on the core and the tread portion is moulded onto the reinforcing structure so as to incorporate the same.

4. A method as claimed in claim 1, wherein the core is in a state of radially inward compression during the moulding of the tread portion.

5. A method as claimed in claim 1 wherein said curing is prior to removal of the core from the moulded tire.

6. A method as claimed in claim 1, wherein the uncured rubber used in moulding the tread portion of the tire has been mechanically worked by a feed screw, sufficiently to destroy its nerve or memory without starting it on its cure cycle.

7. A method of manufacturing a pneumatic tire comprising:
   initially molding a tread portion of the tire from uncured rubber in an annular mold cavity, the radially outer surface of which is defined by a surface of a tread ring mold and the radially inner surface of which is defined by a surface of a solid mold core, having substantially the shape of the interior of the tire to be molded, of cured rubber which is radially inwardly compressed during molding of the tread portion,
   supporting the mold core during molding of the tread portion with rigid side plates which engage sidewall molding surfaces of the core,
   removing said side plates after molding said tread portion,
   leaving said tread portion in place between said core and said tread ring mold,
   thereafter inserting mold halves defining sidewall molding cavities with the sidewall molding surfaces of the core,
   thereafter forcing uncured rubber into the sidewall molding cavities to mold sidewalls onto the tread portion, and
   curing said rubber of said tread portion and said sidewalls.

* * * * *